Figure 1:
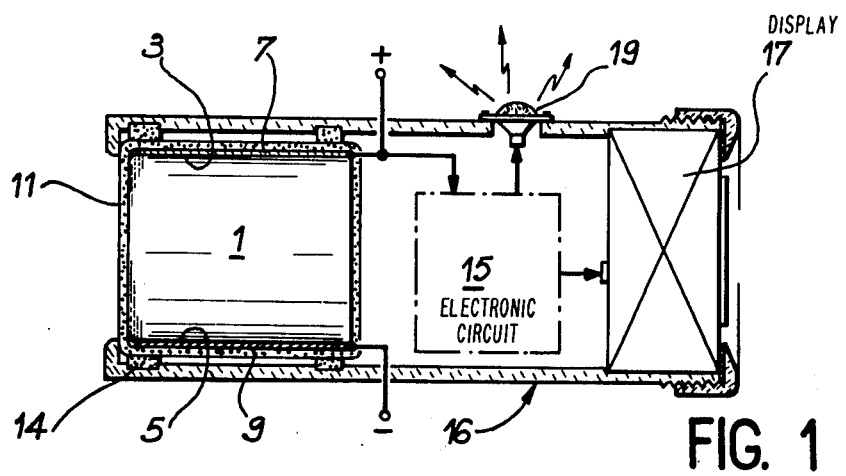

United States Patent [19]

Allemand et al.

[11] Patent Number: 4,461,952

[45] Date of Patent: Jul. 24, 1984

[54] PORTABLE COMPUTING DEVICE FOR MEASURING RADIATIONS

[75] Inventors: Robert Allemand, Saint Ismeer; Michel Laval, Grenoble; Pierre Parot, Seyssinet, all of France

[73] Assignee: Commissariat a l'Energie Atomique, Paris, France

[21] Appl. No.: 312,774

[22] Filed: Oct. 19, 1981

[30] Foreign Application Priority Data

Oct. 24, 1980 [FR] France ................... 80 22814
Mar. 23, 1981 [FR] France ................... 81 05754

[51] Int. Cl.³ .............................................. G01T 1/22
[52] U.S. Cl. .................................................. 250/370
[58] Field of Search ........................ 250/370, 371, 336

[56] References Cited

U.S. PATENT DOCUMENTS 4,197,461 4/1980 Umbarger et al. ................. 250/370
4,210,805 7/1980 Kobayashi et al. ................. 250/370
4,301,367 11/1981 Hsu .................................... 250/370

Primary Examiner—Janice A. Howell

[57] ABSTRACT

The present invention relates to a portable computing device comprising, in known manner, means for adding digital information, means for determining periods of time and display means, wherein it also comprises a nuclear detector adapted to deliver electrical signals whose amplitude spectrum depends biunivocally on the energy spectrum of the radiation in which it is placed and means for converting these signals into digital information, the addition means receiving said digital information, the means for determining periods of time controlling said addition means so as to make a calculation of the dose of nuclear radiation received during a period of time, called integral dose, which is displayed by said display means. The invention is more particularly applicable in the domain of protection against radiation, or health physics.

7 Claims, 4 Drawing Figures

PORTABLE COMPUTING DEVICE FOR MEASURING RADIATIONS

The present invention relates to a portable computing device for measuring radiations, using a radiation detector and ensuring electronic compensation of the hypersensitivity of this detector to low-energy radiation; this detector is preferably a semi-conductor detector. Electronic compensation makes it possible to measure exactly the integral dose per unit time of the radiation. This device allows direct display of the integral dose. Moreover, this portable device may deliver an alarm signal for a given dose rate of said radiation. This portable device is particularly applicable in the domain of protection against radiation, or health physics.

At certain work stations, for example in nuclear installations, the personnel is constantly exposed to the effect of radiation. It is consequently important to know, with precision, at the end of or during each period of presence at these work stations, the dose received by the personnel and the dose accumulated for example in the course of a quarter or a year, in order to ensure that the regulations in force in this field are respected. The personnel must therefore permanently wear portable devices such as individual dosemeters to know the dose of radiation received in the course of certain works. These portable devices may also be used in nuclear or radiological medicine by the doctors or the patients.

Various types of portable direct read-out devices exist at present, including in particular:

pocket dosemeters generally comprising a small-dimension ionization chamber with which is associated an electroscope and giving the integral dose per unit time with a direct analog read-out. This type of dosemeter does not generally deliver an alarm signal for a given dose rate and compensation of the hypersensitivity of the detector, here the ionization chamber, to the low-energy radiation, is effected by means of screens, for example made of graphite, whose use is delicate and limited and enabling only a rough compensation to be made. These dosemeters are, moreover, very sensitive to shocks, which causes errors in measurements of the doses received. Similarly, the range of measurement is limited as well as the number of graduations of the scale, which renders read-out delicate. Finally, it is not easy to recharge the chamber after use, i.e. return it to zero and this operation can only be carried out by specialised staff;

miniature Geiger-Müller counters, associated with an electronic processing circuit which delivers a sound signal for a given dose rate and gives the integral dose per unit time with direct readout. In this type of dosemeter, energy compensation is effected, as for the ionization chambers, by means of screens such as tin and lead screens. Moreover, these dosemeters have a reduced lifetime, associated with wear of the counters by pollution of the gases contained in said counters in the course of time. Finally, their functioning requires the use of a high supply voltage, therefore the use of a D.C.—D.C. converter.

It is an object of the invention to provide a massproduced portable computing device such as mini-computers, on which is added a "nuclear detection" function for measuring radiation. This computer device provided with its "nuclear detection" function overcomes the above-mentioned drawbacks and enables the hypersensitivity of the detector to low-energy radiation to be compensated more simply and more completely.

The invention therefore relates to a portable computing device comprising, in known manner, means for adding digital information, means for determining periods of time and display means, wherein said device also comprises a nuclear detector adapted to deliver electrical signals whose amplitude spectrum depends biunivocally i.e. in a one-to-one relationship on the energy spectrum of the radiation in which it is placed and means for converting these signals into digital information, the addition means receiving said digital information, the means for determining periods of time controlling said addition means so as to make a calculation of the dose of radiation received during a period of time, called integral dose, which is displayed by said display means. This dose corresponds to the dose of radiation received by human tissues when they are near the detector.

According to a secondary feature of the computing device, it comprises electronic means for compensating the sensitivity of the detector as a function of the energy of the radiation so as to render it identical to that of human tissues, so that the detector produces an output signal which is in a constant ratio with the energy of said radiation which may be absorbed by human tissues.

A detector whose response is in a constant ratio with the energy absorbed by the human tissues for the radiation in question is called a "tissue equivalent" detector. It should be noted that, in the invention, the detector is rendered "tissue equivalent" due to the electronic processing of the signals which it furnishes.

According to a preferred embodiment of the invention, the detector is a detector with semiconductor crystal such as for example cadmium telluride or silicon.

It should be noted that a certain number of individual devices have been proposed which comprise a semiconductor detector of the cadmium telluride type, giving only an alarm signal indicating the presence of radiation, therefore a dose rate, but giving no information on the integral dose of the radiation and making no compensation of the hypersensitivity of the detector to low-energy radiation.

According to another preferred embodiment of the invention, the portable device further comprises a nuclear filter constituting an absorbent screen.

The invention will be more readily understood on reading the following description with reference to the accompanying drawings, in which:

FIG. 1 schematically shows a portable device according to the invention.

Figure 2:
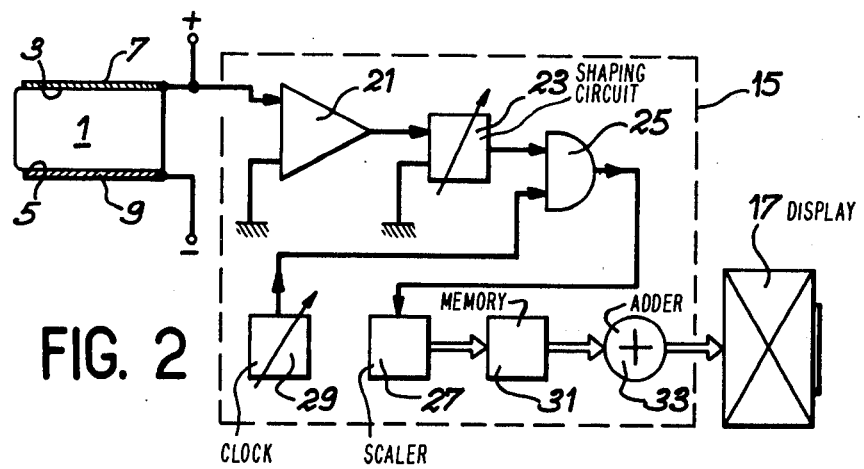

FIG. 2 schematically shows a first variant of the electronic circuit of the device according to the invention.

Figure 3:
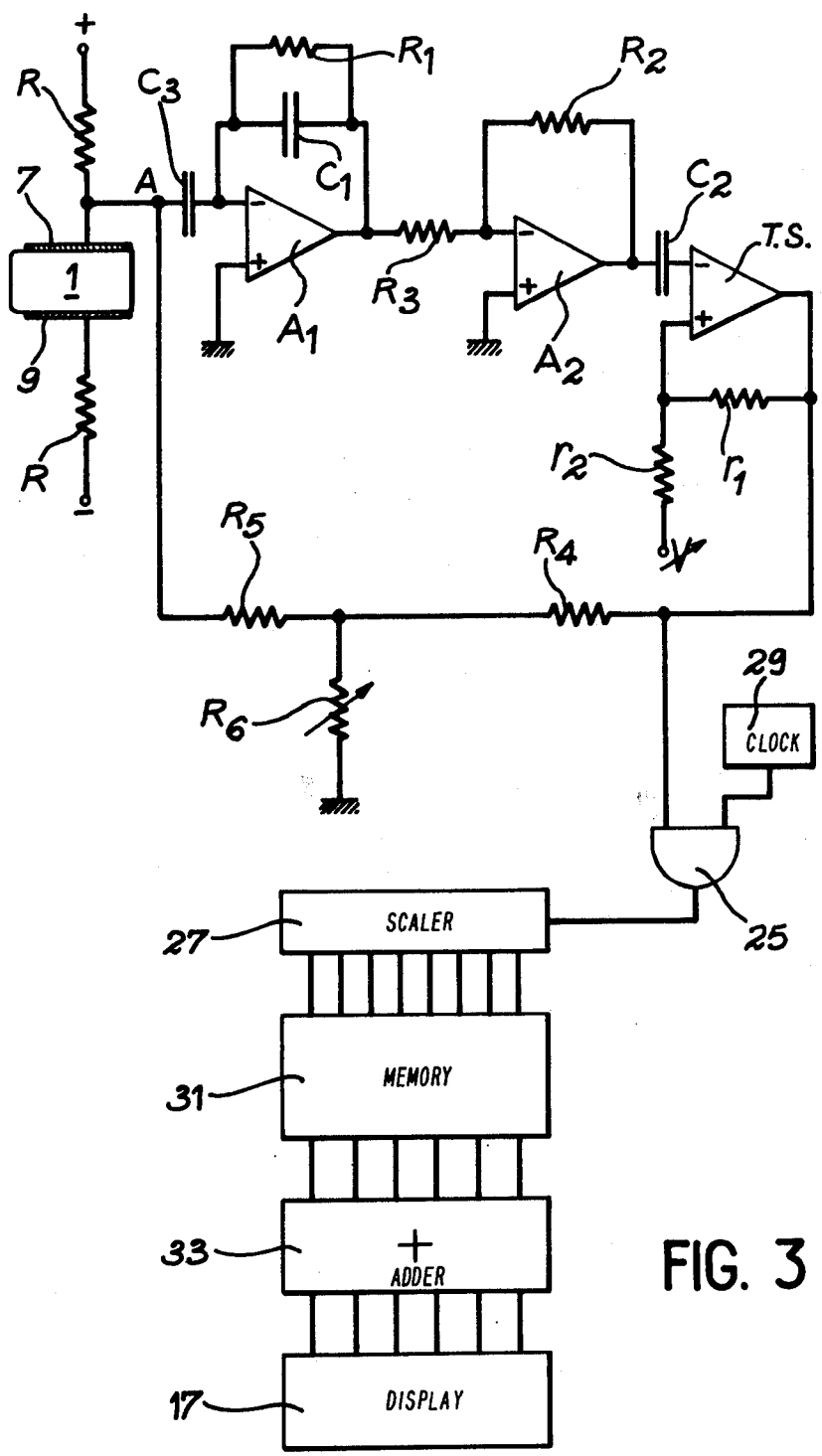

FIG. 3 shows a detailed diagram of the electronic circuit of FIG. 2.

Figure 4:
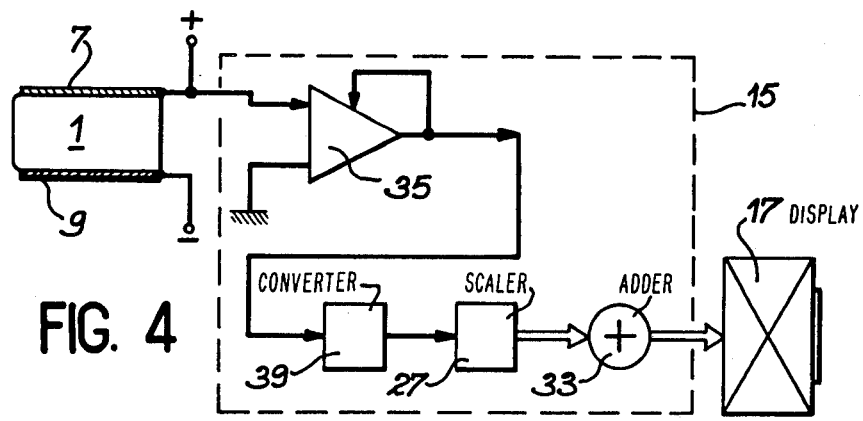

FIG. 4 schematically shows a second variant of the electronic circuit of the device according to the invention.

According to the invention, the computing device comprises a "nuclear detection" function which measures radiation. This function is in fact performed by a portable device of the individual dosemeter type which will be described first. This portable device of the individual dose meter type is shown schematically in FIG. 1. This portable device comprises a detector, for example with semiconductor crystal 1 such as a crystal of cadmium telluride or of silicon functioning at ambient temperature. Two metal electrodes 7 and 9 are disposed on the opposite faces 3 and 5 of the crystal detector 1, between which is established, by means of a supply source, a potential difference of the order of a few volts. The semiconductor detector 1 may be associated with a set of absorbent screens 11, enveloping the detector and made of a material containing tin and lead, acting as nuclear filter similar to those used with Geiger-Müller counters and serving for precompensation of the energy of the radiation arriving on this detector. The fact of enveloping the detector entirely enables the response of the detector to be rendered isotropic, i.e. identical whatever the side by which the radiation enters in the detector. Shims such as 14 hold the crystal detector 1 in a casing 16 made of a light material which does not absorb the radiations, such as plastics material or aluminium.

Under the action of radiation, the conductivity induced in the semiconductor produces electrical signals whose amplitude spectrum depends biunivocally on the energy spectrum of said radiation. It should be noted that, for a monoenergetic radiation, the signal furnished by the detector will not be unique, but will be composed of a spectrum whose form will be unique and whose maximum amplitude will be proportional to the energy of the radiation detected.

The role of the electronic circuit 15, associated with the detector, is to process this signal so as to convert it into one or more magnitudes which may be directly used by the personnel, such as the dose rate and the integral dose. These magnitudes are displayed on a liquid crystal display 17, for example. Moreover, the electronic circuit 15 controls a sound alarm 19 which triggers off for a given digital threshold of dose rate or of integral dose of a radiation, thus indicating the presence of radiation.

Before describing the electronic circuit, associated with the crystal detector of the individual dosemeter shown in FIG. 1, a few physical elements of radiation detection and in particular of $\gamma$ radiation detection will be recalled. It is known that bombardment by $\gamma$ radiation of a material leads to emission of secondary particles possessing an electrical charge. In particular, this bombardment makes it possible to obtain the photoelectric effect (ejection of an electron from layers K or L of an atom by loss of all the energy of the photon) or the Compton effect (shock between a photon and a free electron of an atom during which the ejected electron receives only a part of the energy of the incident photon).

The use of a semiconductor material presenting a high number of electrons Z or atomic number leads to the number of interactions with the material, for a given energy flux $\gamma$, being much greater if this flux is of low-energy. In fact, for an energy flux E lower than 250 KeV, the number of interactions follows the law of the photoelectric effect, i.e. the number of interactions is proportional to $Z^5 \cdot E^{-3.5}$, and for an energy flux E of between 250 KeV and 1 MeV, the number of interactions follows the law of the Compton effect, i.e. the number of interactions is proportional to $ZE^{-1}$.

For human tissues, of which the number Z is much lower than that of cadmium telluride, in particular, the law is very different as the photoelectric effect is proportionally less important than the Compton effect. Consequently, when a detector with Z higher than that of biological tissues is used, it is necessary to reduce the hypersensitivity of the detector for low-energy $\gamma$ fluxes.

Electronic compensation, which is associated with the semiconductor detector, therefore enables the sensitivity curve of the semiconductor detector to be modified as a function of the energy of the radiation so as to render said sensitivity curve flat, i.e. the signal furnished by the device of the invention equipped with this detector is proportional to the energy absorbed by the human tissues for the radiation in question.

It should be noted that this electronic compensation is possible as the spectral response of the detector, for example with semiconductor crystal such as cadmium telluride or silicon, is a biunivocal function of the energy of the radiation. This compensation cannot be envisaged with Geiger-Müller dosemeters since, in this case, the amplitude of the pulses is independent of the initial energy.

It has been stated hereinabove that the semiconductor detector could be made either of cadmium telluride or silicon. It should be noted that silicon has the advantage over cadmium telluride of being closer to a "tissue equivalent" response since the atomic number of silicon is lower than that of cadmium telluride, therefore closer to the mean atomic number of human tissues. On the other hand, silicon has the drawback of being easily made only in small dimensions ($5 \times 5$ mm$^2$ of surface on 0.5 mm thickness); this limits its use to determining average and high dose rates and integral dose, i.e. greater than 10 mrd/h. Cadmium telluride, although handicapped by a poorer energy response, has the advantage of presenting a very good sensitivity, as it may be made in much larger dimensions than those of silicon ($5 \times 5 \times 5$ mm$^3$). Furthermore, its power to stop radiation is much greater than that of silicon as its atomic number and its density are higher than those of silicon.

FIGS. 2, 3 and 4 show two embodiments of the electronic circuits associated with the detector for example with semi-conductor crystal.

In the first embodiment, schematised in FIGS. 2 and 3, the means for processing the signal issuing from the detector are of digital type. In FIG. 3 showing a detailed diagram of the electronic circuit, the detector 1 is connected to the source of supply via high value resistors R, i.e. of several tens of megohms.

The signal or pulse issuing from the detector 1, presenting a very low amplitude, must firstly be amplified by means of an amplification chain such as 21 before being compensated according to the invention. This amplification chain may be constituted as shown in FIG. 3 by an amplifier $A_1$ with low back-ground noise, functioning as preamplifier of charge with a capacitor $C_1$ of 0.5 to 1 picofarad and a resistor $R_1$ such that $R_1 C_1$ is between 50 and 100 microseconds and by an amplifier $A_2$ mounted as voltage amplifier by means of a resistor $R_2$, the output of the amplifier $A_1$ being connected to the negative input of the amplifier $A_2$ by means of a resistor $R_3$.

In this embodiment, the electronic compensation means essentially comprise a shaping circuit 23 ensuring amplitude-time conversion and, in parallel, the "threshold" function via two resistors $r_1$ and $r_2$, in order to eliminate the pulses of amplitude too low to be taken into account and in particular the noise created by the leakage current of the crystal detector 1. This shaping circuit connected to the output of the amplifier $A_2$ via a capacitor $C_2$ may be constituted by an S.T. circuit (FIG. 3) known under the name of Schmitt trigger and produces signals in the form of square pulses serving to discharge the capacitor $C_1$ of the preamplifier $A_1$.

Discharge of the capacitor $C_1$ may be effected by means of a negative feedback chain constituted by two resistors $R_4$ and $R_6$ in series, mounted as variable divider bridge so as to vary the amplitude of the signal furnished by the shaping circuit 23, and by a high value resistor $R_5$, i.e. of several tens of megohms. This resistor $R_5$ converts the voltage of the square pulses furnished by the shaping circuit 23 into a constant current which will serve to discharge the capacitor $C_1$ in linear manner. The resistor $R_6$ therefore makes it possible to regulate the value of the discharge current of the capacitor $C_1$, therefore the duration $\Delta T$ of this discharge. This resistor $R_6$ is regulated so that the duration of discharge $\Delta T$ of the capacity $C_1$ is short with respect to the duration $R_1C_1$, i.e. that $\Delta T$ is close to $R_1C_1/3$, viz. 10 to 13 microseconds.

In summary, upon detection of radiation, the detector furnishes a quantity of charge Q which will charge the capacitor $C_1$ and give at the output of the amplifier $A_1$ a voltage level $\Delta V$ equal to $Q/C_1$ which the amplifier $A_2$ will reverse and amplify. If the amplitude of the voltage level exceeds the threshold of the shaping circuit 23 which is adjustable ($V$), the shaping circuit trips and, via the negative feedback chain $R_4$, $R_6$, $R_5$, discharges the capacitor $C_1$ until the output signal of the amplifier $A_2$ is zero, at that instant, the shaping circuit 23 returns to its initial state, awaiting a new pulse.

The duration of the square pulse furnished by the shaping circuit 23 is proportional to the energy of the ionizing radiation arriving on the crystal detector 1. The negative feedback chain $R_4$, $R_6$, $R_5$ is connected to a point A located in front of an input capacitor $C_3$ connecting the detector 1 to the negative input of the preamplifier $A_1$. The pulsed current which passes through the capacitor $C_3$ then presents a mean value of zero since is traversed in one direction by a quantity of charge Q furnished by the crystal detector 1 and which is stored in the capacitor $C_1$, then in the other direction by a quantity of charge $-Q$ furnished by the negative feedback chain. Consequently, the mean potential of point A is constant, whatever the ouptut signal from the detector.

In the embodiment described hereinabove, the conversion into time of the amplitude of the signals leaving the amplification chain 21 is linear, but a non-linear amplitude-time conversion may be envisaged, according to a preestablished law making it possible, for example, to associate a duration shorter for low-energy radiations than for high energy radiations.

The signal issuing from the shaping circuit 23 opens the gate 25 of a scaler 27 which counts the pulses issuing from a lock 29 of fixed frequency for example 1 MHz.

Upon each detection of an energy particle greater than a certain threshold, a pulse issues from the shaping circuit 23 whose duration is associated with the energy of the ionizing particles arriving on the detector 1. The duration of the pulses is then divided into ten classes 0 to 1 $\mu$s, 1 to 2 $\mu$s ..., 9 to 10 $\mu$s, converting the duration of the pulses issuing from the circuit 23 into a number of pulses with the aid of the fixed frequency clock 29. The scaler 27 therefore furnishes, upon each event detected, an address comprised for example between 1 and 10 corresponding to 10 classes of energy increasing from 1 to 10. Energy compensation is then ensured by a memory 31 such as a programmable or reprogrammable read-only memory (PROM or REPROM) which allocates to each event, according to its address, therefore the class in which it is found, a predetermined value (ranging from 1 to 64 for example), so as to apply a higher weight to the highest class (10) therefore give more weight to high energies than to low energies, which enables the hypersensitivity of the detector to low energies to be compensated, the too numerous events detected by the low-energy detector with respect to human tissues being compensated by the allocation of a lower weight than that given to the high-energy events.

The result, i.e. the integral dose received by the detector, therefore consists in adding these successive values furnished by the memory 31, during each event detected, by means of an adder such as 33. The final result is then displayed on display 17.

The introduction of the memory 31 enables any law of compensation of the energy of the ionizing particles to be carried out discretely; this allows adaptation to any volume and quality of the detector. In fact, the choice of the weight to be allocated to the different energies is made with the detector itself which is exposed to radiation either with a plurality of sources emitting known doses at each of the energies corresponding to the 10 classes retained in the example of compensation, or using a single broad spectrum source, called "white dose source", i.e. emitting a constant number of mrd/h/keV on an energy range corresponding to the response range of the measuring device (for example from 50 keV to 3 MeV).

This second solution which is more difficult to carry out as it necessitates adjustment of a "white dose" source, is, however, preferred to the first which necessitates as many sources as classes of energy retained for compensation, viz. 10 in the example given hereinabove. This white source exposes the detector to radiation and the distribution of the amplitudes, i.e. the spectral response of the detector excited by this white source, is measured. To this end, an apparatus known under the name of multichannel amplitude analyser (comprising at least as many channels as classes of energy) is used, without its amplitude coder. In fact, the measuring device described previously up to the scaler 27 inclusive, constitutes an amplitude coder comprising a modest number of channels (10 in the example described), each event being coded in an address comprised between 1 and 10.

It is then demonstrated that the distribution of the amplitudes thus stored by the amplitude analyser is the inverse of the compensation curve to be placed in the memory 31. The balance coefficients of each class may thus easily be calculated by calculating the inverses of the contents of the 10 channels obtained previously and by adapting the results to the capacity of the memory 31:1 to 64 to 1 to 128 or 1 to 1024 according to the desired precision of compensation.

This calibration therefore enables each detector to be exactly compensated, in relatively simple manner for the man skilled in the art. Standard laws of compension corresponding to different sizes of detector may also be envisaged, which will obviously introduce a certain error which will be the less as manufacture of the detectors from the point of view of reproducibility will be mastered.

In place of the fixed frequency clock, a clock with increasing frequency may be used, which must then start up at the instant the shaping circuit 23 trips. This clock then delivers a sequency of pulses which is advantageously of high frequency for 6 pulses for example, of half frequency for 2 pulses, then of frequency further halved for two other pulses, in the example of 10 classes of energy. This makes it possible to analyse more finely the energy zone comprised between 50 and 300 keV, moderately the energy zone comprised between 300 and 800 keV and roughly the energy zone comprised between 800 keV and 3 MeV. In fact, the differences in responses between the detector, particularly with cadmium telluride and the human tissues are considerable and rapidly variable in the low energies, and reduce in the high energies. This therefore makes it possible to limit the number of classes, whilst having a completely satisfactory energy analysis.

Furthermore, it may readily be ascertained that this process of analysis reduces at the same time the dynamics of energy compensation as the first classes of energy being narrower, they will include fewer events and will therefore be affected by a precompensation equal to the ratio of the clock frequencies at the end and at the beginning of the clock cycle. Similarly, the mean classes will be affected by a precompensation equal to the ratio of the frequencies at the end and in the middle of a clock cycle. Consequently, in the example of sequence given hereinabove, a gain of 4 is obtained on the compensation dynamics. It is obvious that all the combinations of clock frequencies and of number of classes are not limited, the given example of 10 classes of energy having been given only by way of example. It is at present very easy to carry out such programmed sequencies with presently available technological integrated circuit elements, by the man skilled in the art.

By means of compensation using the clock with increasing frequency, the nuclear filter 11, performing precompensation, may be associated. This enables a lower, therefore better energy compensation to be effected.

According to another embodiment, the means for amplifying and compensating the electrical signal issuing from the crystal detector 1 are of analog type. Such means are shown in FIG. 4. In this embodiment, the amplification and compensation means comprise a variable gain amplifier 35, i.e. as a function of the amplitude of the output signal from the detector, depending on the energy of the radiation, the gain of the amplifier is modulated so as to give more weight to the strong pulses than to the weak. The integral dose per unit time may be displayed, as before, on the display 17 via the adder 33, the scaler 27 and an analog-to-digital converter 39 connected to the gain amplifier 35.

In this embodiment, the integral dose may be displayed in analog manner by replacing the scaler 27 and the analog-to-digital converter 39 by an integrator directly giving the integral dose per unit time.

Of course, any other embodiment for compensation of energy of the radiations enabling "tissue equivalent" signals to be produced may be envisaged without departing from the scope of the invention.

Semiconductor detectors functioning at ambient temperature have now reached a technological level such that their properties enable them to be used for protection against radiation or health physics. These properties are as follows:

very small dimensions (a few cubic millimeters);
fairly broad energy range (some 10 keV to 1 MeV);
able to be electronically compensated to respect dosimetry standards;
supply under low voltage, compatible with the voltages used in micro-electronics.

According to the invention, a "nuclear detection" function is added in the portable computing devices such as mini-computers or in watches, by placing in the portable device a detector with semiconductor such as cadmium telluride or silicon and presenting the above described properties. To know the dose rate and possibly the integral dose of a radiation, certain functions which exist in such devices will then be used, such as digital display, sound alarm, integration, counting, electronic chronometer, wait registers, ..., by intercalating an appropriate integrated circuit between the digital circuits corresponding to these functions and the semiconductor detector.

In fact, digital display may be used for displaying the dose rate, the dose, the points of the energy spectrum, etc...., integration and counting will make it possible to calculate the integral dose, the electronic chronometer will enable the dose rate to be calculated and the wait registers will make it possible to choose alarm thresholds (presence of radiations).

These portable devices, mass produced, may be used as electronic badges performing: the functions of dosemeter with alarm over a dose rate threshold, the functions of calculating the integral dose easily centralised in a direct data processing system for seizing digital information, the functions of direct read-out of dose rate or of integral dose.

These portable devices provided with the "nuclear detection" function are applicable in the same domains as those using an individual dosemeter such as described hereinabove.

What is claimed is:
1. Portable computing device comprising means for adding digital information, means for determining periods of time and display means, and a nuclear detector adapted to deliver electrical signals whose amplitude spectrum depends in a one-to-one relationship on the energy spectrum of the radiation in which it is placed and means for converting these signals into digital information, electronic means for compensating the sensitivity of the detector as a function of the energy of the radiation so as to render it identical to that of human tissues so that the detector produces an output signal which is in a constant ratio with the energy of said radiation which may be absorbed by human tissues, the addition means receiving said digital information, the means for determining periods of time controlling said addition means so as to make a calculation of the dose of nuclear radiation received during a period of time, called integral dose, which is displayed by said display means.

2. The device of claim 1, wherein the nuclear detector is a detector with semiconductor crystal.

3. The device of claim 2, wherein the detector with semiconductor crystal functions at ambient temperature.

4. The device of claim 3, wherein the semiconductor crystal is a crystal of cadmium telluride.

5. The device of claim 3, wherein the semiconductor crystal is a silicon crystal.

6. The device of any one of claims 1 to 5, wherein the means for determining periods of time control the addition means so as to make a calculation of the mean dose of nuclear radiation during a period of time, which is displayed by the display means.

7. The device of any one of claims 1 to 5, wherein it comprises means for determining a digital threshold, means for comparing one of the pieces of information delivered by the addition means with this digital threshold and alarm means controlled by said comparison means.

* * * * *